Aug. 2, 1960

N. SCHMITT 2,947,085

HAND SAW CONSTRUCTION

Filed Dec. 2, 1957

INVENTOR.
NICHOLAS SCHMITT
BY
Barney, Kiselle, Raisch & Choate
ATTORNEYS

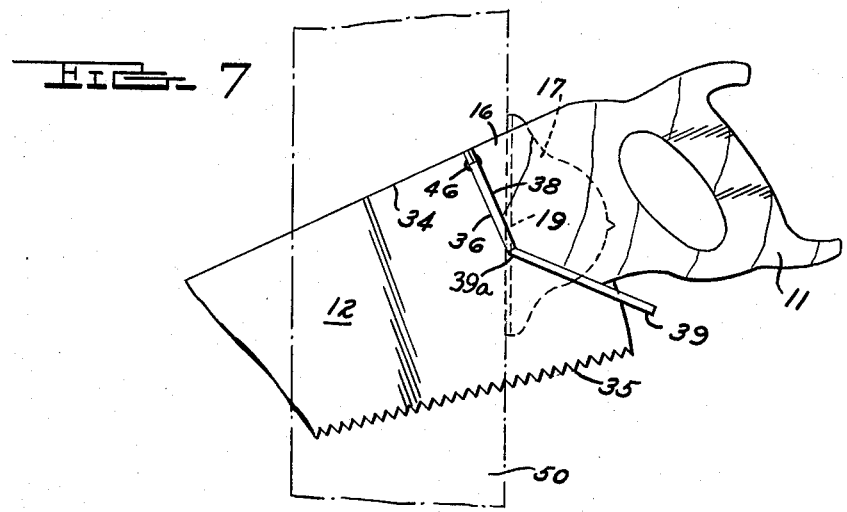
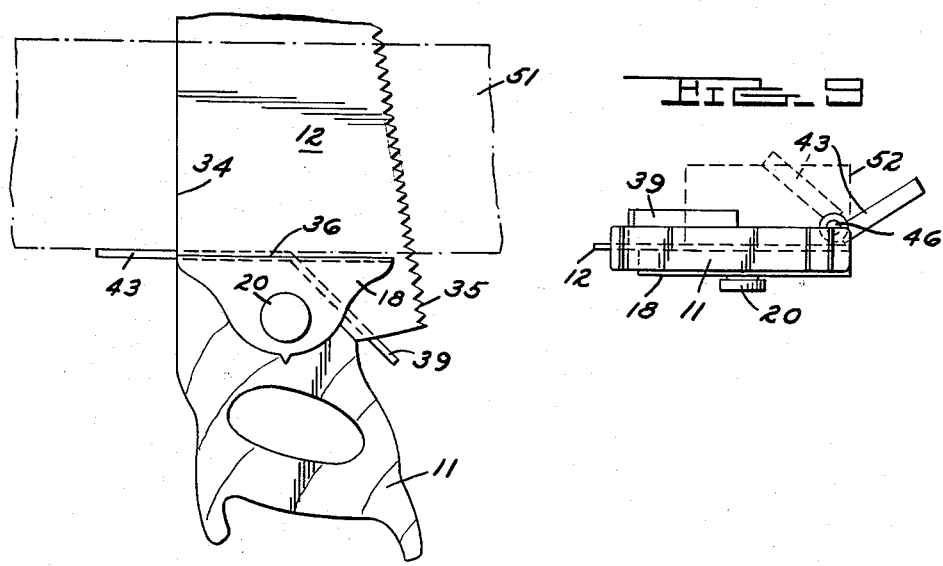

United States Patent Office 2,947,085
Patented Aug. 2, 1960

2,947,085

HAND SAW CONSTRUCTION

Nicholas Schmitt, P.O. Box 264, Wolverine, Mich.

Filed Dec. 2, 1957, Ser. No. 699,975

2 Claims. (Cl. 33—75)

This invention relates to hand saws and particularly to a hand saw construction which enables the saw to also be used as a protractor and square.

It is an object of this invention to provide an inexpensive hand saw which includes an accurate protractor.

It is a further object of this invention to provide such a saw which is inexpensive to construct.

It is a further object of this invention to provide such a saw which permits various angles to be ruled on the end of a piece of wood such as a two by four.

In the drawings:

Figs. 7, 8 and 9 are fragmentary views showing the saw in various operative positions for measuring and ruling on pieces of wood.

Figure 1:
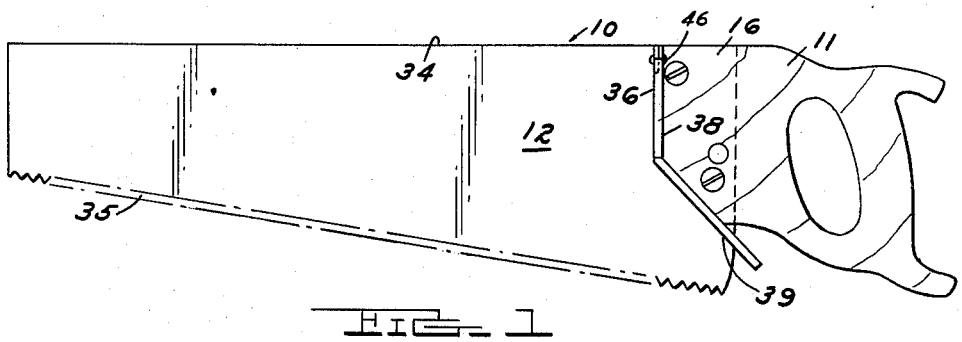
Fig. 1 is a side elevational view of a saw embodying the invention.
Figure 2:
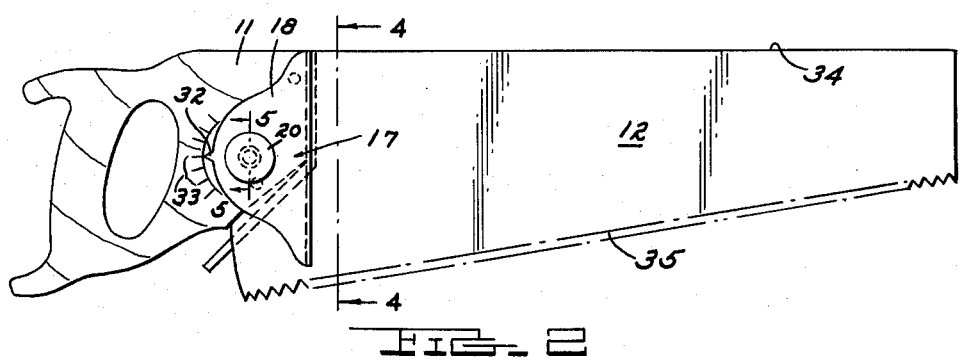
Fig. 2 is a side elevational view taken from the side opposite to that of the view shown in Fig. 1.

Referring to Figs. 1 and 2, saw 10 comprises a handle 11 and a saw blade 12 mounted on the handle 11 by bolts 13. The handle 11 is provided with a slot 14 into which the blade 12 extends. The slot 14 divides the handle into sections 15, 16 of generally uniform width and thickness throughout. A protractor member 17 is mounted on section 15 and comprises a first flat portion 18 and a second portion or flange 19 at right angles to the portion 18. Protractor member 17 is rotatably mounted on the handle 11 by a nut 20 and a bolt 21 in such a manner that the surface of flange 19 is at right angles to the plane of saw blade 12.

Figure 5:
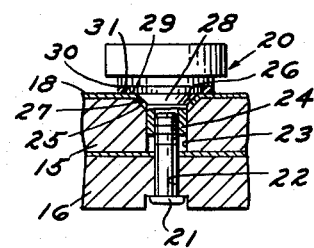
Fig. 5 is a fragmentary sectional view on an enlarged scale taken along the lines 5—5 in Fig. 2.

Referring to Fig. 5, section 16 of the handle is provided with an opening 22 through which bolt 21 extends. Section 15 of the handle is provided with an opening 23 axially aligned with opening 22 and having a greater diameter than the opening 22. Nut 20 includes a sleeve 24 at the lower end thereof which is threaded on the portion of bolt 21 which extends into opening 23. The outer diameter of sleeve 24 is substantially equal to the diameter of opening 23. Section 15 of the handle is provided with a frusto-conical bevel or surface 25 surrounding the outer end of the opening 23, and portion 18 of protractor member 17 is provided with an opening 26 axially aligned with openings 22, 23. The portion 27 surrounding the opening 26 is bevelled to provide a frusto-conical surface complementary to the surface 25 in section 15 of the handle.

Nut 20 includes a frusto-conical or bevelled surface 28 which contacts the frusto-conical portion 27 of the protractor member when the nut 20 is tightened on bolt 21. The nut 20 also includes a shoulder 29 surrounding the surface 28 and contacting the portion of protractor member 17 which surrounds the frusto-conical portion 27. Nut 20 also includes an annular shoulder 30 spaced axially from shoulder 29. A gasket 31 of resilient material is provided between shoulder 30 and the portion 18 of the protractor member to resiliently grip the protractor member. Protractor member 17 includes a reference projection 32 which cooperates with equally angularly spaced reference marks 33 on the handle to indicate the relative position of the protractor member with respect to the handle.

Saw blade 12 includes a straight edge 34 and a conventional saw edge 35. In the position shown in Fig. 2, straight edge 34 is at right angles to the plane of flange 19 of the protractor member 17. By loosening the nut 20, the protractor member 17 may be moved to a new position where it will be held by tightening the nut 20.

Referring to Fig. 1, a first member 36 is mounted by screws 37 on the handle 11 and specifically on surface 38 of section 16, which surface lies in a plane at right angles to the plane of the saw blade and at right angles to the straight edge 34 of the saw blade. A second or extension member 39 is mounted on the handle 11 by screws 40 and includes a surface which lies in a plane at right angles to the plane of the saw blade and forming an acute angle with the plane of member 36, second member 39 includes a portion 39a which is coplanar with the member 36.

Figure 3:
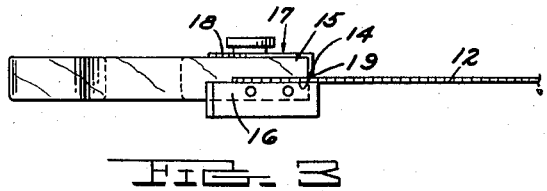
Fig. 3 is a fragmentary plan view of the saw.
Figure 4:
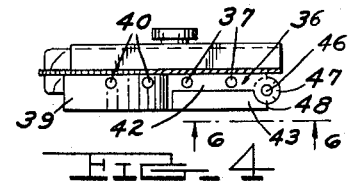
Fig. 4 is a fragmentary sectional view taken along the line 4—4 in Fig. 2.
Figure 6:
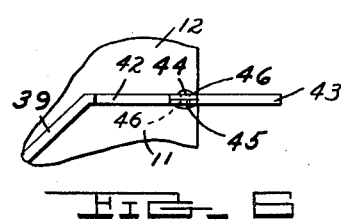
Fig. 6 is a fragmentary end elevational view taken generally along the line 6—6 in Fig. 4, showing the parts in a different position.

As shown in Figs. 1, 3 and 4, sections 36 and 39 are of uniform thickness and width throughout. Member 36 is divided into a first fixed section 42 and a second movable section 43 which is pivoted to section 42. The sections are of substantially equal width throughout. Each section 42, 43 is substantially equal in width to the thickness of the portion of the handle 11 which lies on the same side of the blade 12 on which the members 36, 39 are mounted. As shown in Fig. 6, one end of each section 42, 43 is reduced in thickness as at 44, 45, respectively, and a pin 46 extends through the sections and pivots one to the other. Movable section 43 is movable from a position wherein its side edges are parallel and adjacent to the side edges of section 42 to a position wherein the side edges are in alignment and parallel to the side edges of section 42. Equally angularly spaced indicia marks 47 are provided on the periphery of portion 44 and a reference mark 48 is provided on the end of section 43 whereby the angular relationship of section 43 relative to section 42 may be established by aligning the proper mark 47 with the reference mark 48.

The exposed surface of member 36 lies in a plane at right angles to the plane of the saw blade 12 and at right angles to the straight edge 34. The surfaces of the sections 42, 43 which comprise the member 36 always lie in this plane. The exposed surface of member 39 lies in a plane which forms an angle of approximately 90° with the plane of the saw blade and an acute angle with the plane of member 36, shown as 45° in the drawings.

The use of the saw with protractor member 17 to rule a line on a piece of wood is shown in Fig. 7, wherein the protractor member 17 is rotatably positioned at a predetermined relationship to the handle so that the flange 19 forms a predetermined angle with the straight edge 34. When the flange 19 is brought into abutment with the side edge of a piece of wood 50 the straight edge 34 forms a predetermined angle with the side of the piece of wood so that a line can be ruled on the wood.

The use of the members 36, 39 to establish or rule lines on a piece of wood is shown in Fig. 8 wherein member 36 is in contact with the side edge of a piece of wood 51 thereby establishing the straight edge 34 of the saw blade as being at right angles to the side of the piece of wood 51. Member 39 may be similarly positioned in contact with the side edge of the piece of wood in which case the straight edge 34 of the saw blade will form an angle with the side edge of the piece of wood which is equivalent to the angle which member 39 forms with member 36.

The use of the sections 42, 43 of member 36 to rule lines on the end of a piece of wood such as a two by four is shown in Fig. 9 wherein section 42 has been brought into contact with the face of the end of two by four 52 and movable section 43 is at a predetermined angular relationship to section 42, as determined by the reference mark 48 and indicia marks 47. A line may then be ruled on the end of the wood 52 as desired. The movable section 43 may also be moved beyond the periphery of the handle as shown in dotted lines in Fig. 9 to provide a ruling or measuring edge beyond the periphery of the handle.

The end of the extension 39 adjacent section 42 cooperates with a section 42 to provide a bearing surface that has a substantial dimension in a direction perpendicular to the plane of the blade to enable relatively stable positioning on the end of a board.

It can thus be seen that I have provided a saw construction whereby angular measurements and rulings may be quickly obtained. Such a saw is simple and inexpensive in construction.

I claim:

1. The combination comprising a handle, a blade mounted on said handle in the medial plane thereof, said blade having a straight edge, a member mounted on said handle adjacent the plane of said blade having a planar surface extending substantially from and in a plane at a right angle to the plane of said blade and at a right angle to the straight edge of said blade, said member having a first section fixed to an end face of said handle on one side of the plane of the blade and a second section coplanar with the first section and mounted adjacent one end of the first section for pivotal movement with respect to said first section about an axis parallel to the straight edge of said blade from a position wherein said sections are coplanar, contiguous and superposed edgewise to a plurality of positions wherein said sections are coplanar and angularly related, the width of said first section in a direction perpendicular to the plane of said blade being at least equal to substantially the thickness of the handle on the side of the plane of said blade on which said first section is mounted thereby substantially covering said end face of said handle, said member having an extension at the other end of said first section, said extension having a portion coplanar with the first section, the width of said extension in a direction perpendicular to the plane of said blade being substantially greater than the width of said first section at the other end of said first section, the width of said first section in a direction perpendicular to the plane of said blade at said one end of said first section adjacent said pivotal axis being substantially equal to the width of said extension, thereby providing a bearing surface enabling relatively stable positioning of said handle and blade on the end of a board with said bearing surface in coplanar engagement with the end face of the board and the adjacent portion of the blade in coplanar engagement with an adjacent surface of the board perpendicular to the end face of the board and with the second section of said member angularly related to the first section so that an angle may be scribed on said end face of the board.

2. The combination set forth in claim 1 including indicia means on one of said sections and reference means on the other of said sections for visibly indicating the relative angular displacement of said sections.

References Cited in the file of this patent

UNITED STATES PATENTS

| 761,272 | Wagniere et al. | May 31, 1904 |
| 939,051 | Matthews | Nov. 2, 1909 |
| 1,282,871 | Kraft | Oct. 29, 1918 |
| 1,510,495 | Gurley | Oct. 7, 1924 |
| 1,589,676 | Belgrove | June 22, 1926 |
| 1,679,933 | Dorsaneo | Aug. 7, 1928 |
| 2,399,227 | Hilton | Apr. 30, 1946 |
| 2,606,368 | Ratcliff | Aug. 12, 1952 |

FOREIGN PATENTS

| 38,590 | Sweden | Mar. 24, 1915 |